Patented July 13, 1948

2,445,242

UNITED STATES PATENT OFFICE 2,445,242

PROCESS FOR PRODUCING A 4-AMINO SALICYLIC ACID

Karl-Gustaf Rosdahl, Malmo, Sweden, assignor to Aktiebolaget Ferrosan, Malmo, Sweden, a corporation of Sweden No Drawing. Application February 26, 1947, Serial No. 731,036. In Sweden December, 7, 1945

4 Claims. (Cl. 260—519)

The present invention refers to a process for producing a 4-amino salicylic acid, consisting of the compound 2-hydroxy-4-aminobenzoic acid and its derivatives. According to recent discoveries, this compound and derivatives thereof have been found to possess valuable chemotherapeutic properties. Thus, it has been found by both laboratory and clinical experiments, that the said compound has a better effectiveness against tubercle bacilli than other compounds earlier tried.

The object of the present invention is to provide a new economical and commercially practicable method of producing 2-hydroxy-4-aminobenzoic acid or derivatives thereof in good yields of satisfactory purity.

It is a further object of the invention to provide a new method of producing 2-hydroxy-4-aminobenzoic acid, using 2-amino-4-nitrobenzoic acid as raw material and passing through 2-hydroxy-4-nitrobenzoic acid as an intermediate, which is obtained in good yields and of satisfactory purity to enable the subsequent conversion thereof into the desired final product.

The said intermediate compound, 2-hydroxy-4-nitrobenzoic acid, is already known and may, according to chemical literature, be produced from 2-amino-4-nitrobenzoic acid by a diazotizing process followed by boiling. In this known process, 2-amino-4-nitrobenzoic acid is dissolved in alkali, whereupon sodium nitrite is added. The solution is slowly acidified, and after standing for some time at room temperature it is boiled for 3 to 4 hours, when the desired compound is formed. However, if the synthesis is carried out in this way, it is found that the product obtained, at least if not starting from analytically pure material, has a tarry appearance and can be prepared in the pure state only by a circumstantial purification work. The yield becomes very unsatisfactory. For these reasons, the method can be considered impracticable for producing 2-hydroxy-4-nitrobenzoic acid on a commercial scale.

The method according to the present invention avoids the above-mentioned difficulties by producing the intermediate 2-hydroxy-4-nitrobenzoic acid in a new way and then converting said intermediate into 2-hydroxy-4-aminobenzoic acid in any well-known way. The characteristic features of this method are that 2-amino-4-nitrobenzoic acid or a derivative thereof is diazotized by dissolution in concentrated sulphuric acid while cooling and by the action on the solution of nitrous acid, that the solution obtained, after dilution with water, is boiled in the presence of copper salt, preferably copper sulphate, to form 2-hydroxy-4-nitrobenzoic acid or a derivative thereof, respectively, and that the last-mentioned substance is reduced in any well-known way to chemotherapeutically active 2-hydroxy-4-aminobenzoic acid or a derivative thereof, respectively. The boiling stage is preferably carried out in such a way that the solution after the diazotization is poured into warm water in which copper sulphate is dissolved and is as rapidly as possible brought up to a temperature of 110° to 120° C.

As is well known, the general process of diazotizing aromatic amino compounds is to dissolve them in an acid and add a nitrite to the cooled solution. In some case the conversion has also earlier been carried out in concentrated sulphuric acid. Furthermore, it is generally known to convert diazo compounds into phenols by boiling aqueous solutions of these compounds, and in this connection it has also occurred in isolated cases that copper salt has been used as a catalyst. For producing the intermediate, 2-hydroxy-4-nitrobenzoic acid, here concerned, however, no other method than that mentioned in the above introduction has been disclosed, and as also mentioned this has besides proved to be impracticable for commercial production. A contributory cause of the failure of this method is possibly, although nothing is positively known about it, the fact that the diazonium salt formed as an intermediate at the conversion, as distinct from diazo compounds in general, has relatively great stability and therefore has to be boiled for a long time to be further converted, whereby secondary reactions take place which upset the final result. Unforeseen it has however been found, according to the invention, that by a combination of diazotization with concentrated sulphuric acid and boiling in the presence of copper sulphate one succeeds in obtaining 2-hydroxy-4-nitrobenzoic acid (or derivatives thereof) sufficiently pure and in a sufficiently great yield for the production to be commercially feasible. As further advantages of the method according to the invention may be mentioned that a boiling of short duration is sufficient for obtaining an optimal yield of 2-hydroxy-4-nitrobenzoic acid and that a small liquid final volume is obtained which permits the product to be filtered off without a preceding evaporation.

The course of reaction in this process may be designated

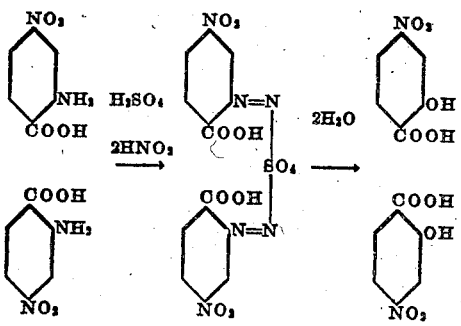

The 2-hydroxy-4-nitrobenzoic acid (or derivative thereof respectively) thus formed can then be reduced in any of the generally known methods for reducing aromatic nitro derivatives (e. g. with tin and hydrochloric acid) to the corresponding amino derivative, which in the form of the hydrochloride

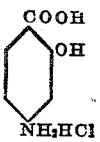

is a substance which crystallizes well in the shape of white needle crystals and has a melting point of approximately 224° C. From this hydrochloride the free base

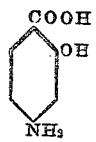

is obtained in the well-known manner in the shape of a white powder having a melting point of approximately 153° C.

Example 1

1 kg. of 2-amino-4-nitrobenzoic acid is dissolved in 6 litres of well cooled concentrated sulphuric acid with agitation. 400 g. of finely powdered sodium nitrite are added in portions, and the agitation is continued for 1½ hours. The solution, which now contains diazonium sulphate, is then poured into a copper sulphate solution about 80° C. warm, whereby the temperature increases to 110° to 120° C. and the diazo compound is decomposed while splitting off nitrogen. After cooling the crystallized substance is filtered off, washed with water and recrystallized. The substance obtained is 2-hydroxy-4-nitrobenzoic acid of good purity, which is suitable for further conversion into 2-hydroxy-4-aminobenzoic acid.

Example 2

1 kg. of 6-amino-3-methyl-4-nitrobenzoic acid is dissolved in 5.6 litres of well cooled concentrated sulphuric acid with agitation. 370 g. of finely powdered sodium nitrite are added in portions. The continuation is analogous to Example 1, and as final product 2-hydroxy-3-methyl-4-aminobenzoic acid is obtained.

Example 3

1 kg. of 4-amino-6-nitroisophthalic acid is dissolved in 4.9 litres of well cooled concentrated sulphuric acid with agitation. 325 g. of finely powdered sodium nitrite are added in portions. The continuation is analogous to Example 1, and as final product 4-hydroxy-6-aminoisophthalic acid is obtained.

Example 4

1 kg. of 2-amino-4-nitro-x-sulphobenzoic acid is dissolved in 4.25 litres of well cooled concentrated sulphuric acid with agitation. 280 g. of finely powdered sodium nitrite are added in portions. The continuation is analogous to Example 1, and as final product 2-hydroxy-4-amino-x-sulphobenzoic acid is obtained.

What I claim and desire to secure by Letters Patent is:

1. A method of producing chemotherapeutics against tuberculosis, comprising diazotizing 2-amino-4-nitrobenzoic acid by dissolution in concentrated sulphuric acid while cooling and by the action on the solution of nitrous acid, diluting the solution obtained with water, boiling the diluted solution in the presence of copper salt to form 2-hydroxy-4-nitrobenzoic acid, and reducing the compound thus formed to 2-hydroxy-4-aminobenzoic acid.

2. A method of producing chemotherapeutics against tuberculosis, comprising diazotizing 2-amino-4-nitro-benzoic acid by dissolution in concentrated sulphuric acid while cooling and by the action on the solution of nitrous acid, diluting the solution obtained with water, boiling the diluted solution in the presence of copper sulphate to form 2-hydroxy-4-nitrobenzoic acid, and reducing the compound thus formed to 2-hydroxy-4-aminobenzoic acid.

3. A method of producing chemotherapeutics against tuberculosis, comprising diazotizing 2-amino-4-nitrobenzoic acid by dissolution in concentrated sulphuric acid while cooling and by the action on the solution of nitrous acid, pouring the diazotized solution into warm water containing dissolved copper sulphate, rapidly heating the mixed solution to a temperature of 110° to 120° C. to form 2-hydroxy-4-nitrobenzoic acid, and reducing the compound thus formed to 2-hydroxy-4-aminobenzoic acid.

4. A method of producing chemotherapeutics against tuberculosis, comprising diazotizing a compound of the formula

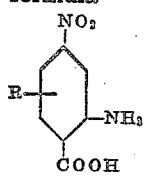

wherein R stands for a member selected from the group consisting of hydrogen, lower alkyl, carboxy and sulfo, by dissolution in concentrated sulphuric acid while cooling and by the action on the solution of nitrous acid, diluting the solution obtained with water, boiling the diluted solution in the presence of copper salt to form the corresponding R-substituted 2-hydroxy-4-nitrobenzoic acid, and reducing the compound thus formed to the corresponding R-substituted 2-hydroxy-4-aminobenzoic acid, R always having the aforerecited significance.

KARL-GUSTAF ROSDAHL.

REFERENCES CITED

The following references are of record in the file of this patent:

Seidel: Ber. Deut. Chem., vol. 34, page 4352 (1901).

Fieser: Organic Chemistry, D. C. Heath & Co., Boston, 1944, pages 621–623.